United States Patent Office

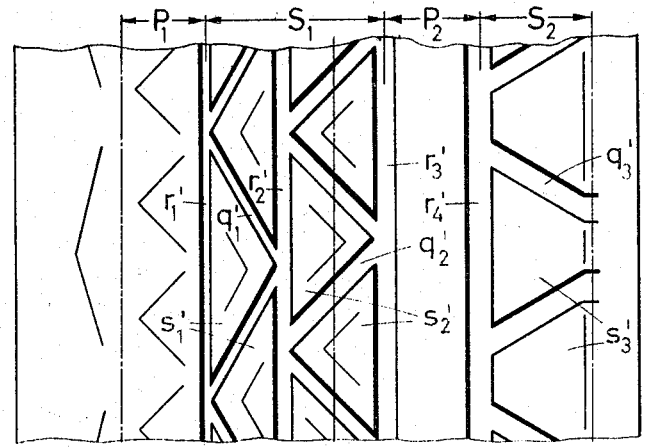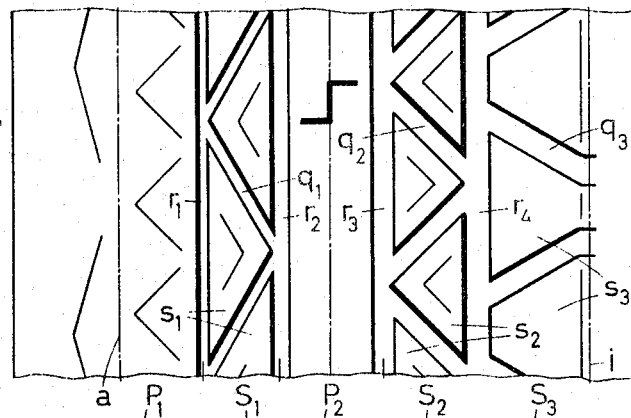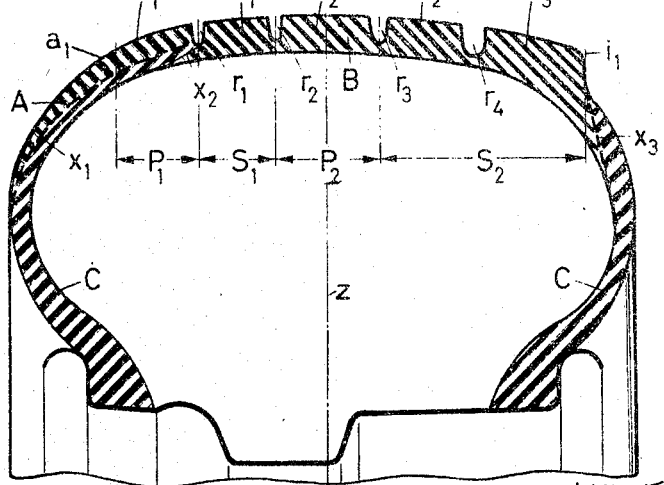

3,286,756
Patented Nov. 22, 1966

3,286,756
AUTOMOBILE TIRE
Willy Ellenrieder, Esslingen (Neckar), and Rudolf Hennecke, Buoch, near Waiblingen, Germany, assignors to Investment in Patent Development S.a.r.l.
Filed Mar. 5, 1965, Ser. No. 437,483
Claims priority, application Germany, Mar. 11, 1964, E 26,591
21 Claims. (Cl. 152—209)

The present invention relates to improvements in tires for automobiles and other motor vehicles.

It is already known in the art that the useful life of an automobile tire may be extended considerably by making it of a wear-resistant rubber. Such tires have, however, been found to have a low resistance to skidding which is especially noticeable when driving along curvy roads.

It has also been found that the different parts of the tread of a tire are subjected to very different kinds of stresses which may further vary very considerably in accordance with the particular manner in which the vehicle is driven, the road conditions which are encountered in driving, and the particular type of wheel suspension of the vehicle. Generally, however, it is possible to distinguish between those parts of a tire which especially have to take up the load as well as the driving and braking forces and other parts of the same tire which especially have to take up the lateral forces in curves. In accordance with these different stresses to which the different parts of a tire are subjected, there is also a considerable difference in the wear upon the rubber of these parts of the tire. Since some parts are worn more quickly than others and the tire must be exchanged when the first parts are worn to a certain limit, it happens very frequently that one or more tires have to be exchanged, even though large parts of them are still in a more or less perfect condition.

It is an object of the present invention to take these different stresses and requirements upon the different parts of a tire into account and to produce a tire, the tread of which will be worn as uniformly and also as little as possible and will also be highly resistant to skidding.

For attaining this object, the present invention provides the tread of the tire to be made of different kinds of rubber so that one part of the tread, especially a part which is subjected to very high stresses, consists of a wear-resistant rubber, while another part, especially the part which has to resist the side thrust of the vehicle, particularly in curves, consists of non-skid rubber.

A tire according to the invention is therefore generally designed so that the central part of the tread is made of a wear-resistant rubber and those parts of the tread which especially resist the side thrust of the tire in curves are made of non-skid rubber. If the tire has an asymetric tread and one shoulder of the tire is provided with a continuous peripherally extending rib which is especially intended for guiding the tire laterally, the continuous rib and possibly also the adjacent parts of the tread are preferably also made of a non-skid rubber, while the remainder of the tread, and especially the part which is divided into lugs, is made of a wear-resistant rubber.

Tires with an asymmetrical tread profile which are provided with a continuous peripherally extending rib on one shoulder of each tire and the tread of which is otherwise divided into lugs may be used not only on dry roads, but especially and with great advantage also on slippery or wet roads as well as on muddy, iced-up and snow-covered roads, provided they are mounted on the wheels so that the mentioned shoulder of each tire on which the continuous rib is provided forms the outside shoulder. These tires are therefore suitable not only for use as summer tires but especially also as winter tires. The continuous rib of the tread which extends peripherally of the tires at the outer side thereof without interruption by any grooves or projections holds the tire and the entire vehicle as well securely on the road and prevents it from slipping laterally not only when the car is driven in a straight direction but also on curvy roads. As a matter of fact, this effect increases with the speed at which the vehicle is driven along a curve and the more the resultant of the load upon the tires is displaced in the outward direction. The division of the remainder of the tread into individual lugs has the further advantage that the tire exerts not only upon a wet road, but also upon a muddy or snow-covered road the required grip for driving and braking the vehicle.

Normally, however, the parts of a tire which are subjected to the highest stresses are those within the central area of the tread adjacent to the highest peripheral line of the uncompressed parts of the tire where the greatest centrifugal forces occur. When rolling along the ground, the tire materials entering the so-called elliptical bearing area of the tire are severely deformed under the load acting upon the wheel, while when leaving this area they again suddenly expand and form a bulge under the moments which are then suddenly released. The deformation of the tire increases with the speed at which the vehicle is driven and it is further affected by the stresses which are caused by the friction between the tread and the road, especially as the result of the acceleration and braking forces. These stresses upon the tire affect and endanger especially the central area of the tread, and if this area is divided into individual lugs, they affect especially the points of connection between these lugs and the transverse grooves because of the notch effect which occurs at these points. This notch effect may even increase if the seam of the tread extends along the highest peripheral line of the tire, since the separating line between the two parts of the mold leaves a projecting ridge which under the stresses upon the tire may cause the latter to tear. This danger becomes especially serious if, due to inaccuracies in the molding operation, the two halves of each lug which are separated by the seam are more or less offset in the peripheral direction relative to each other.

Another feature of the invention therefore consists in making effective provision for these stresses by not only providing a continuous tread rib on the outer tire shoulder, but also another continuous rib within the central area of the tread which is separated from the mentioned outer rib by at least one row of lugs.

This central continuous tread rib forms an uninterrupted band of rubber within the central area of the tread which is most seriously endangered. If in the production of the tire, the peripheral surface of this tread rib is made smooth, it is practically impossible that any notch effect may occur within this area, especially since the solidity of the material of this rib also has a reinforcing effect upon the laterally adjacent parts of the tire at least up to a certain distance from this rib. The necessary grip upon the road for accelerating and braking the vehicle is then attained by the rows of lugs at both sides of the central continuous rib. It has been found that the existence of a single continuous central rib impairs this gripping power of the tire only to an insignificant extent, especially if the distance between this central rib and the other continuous rib on the outer shoulder of the tire is not made too small so that the intermediate lugs may be deformed to the extent as necessary to exert the desired grip.

As previously indicated, the continuous central tread rib has the additional advantage that, if the tire is produced in the conventional manner in a two-part mold, the seam which is formed between the two parts may be located within the area of this central rib. A notch effect will then be eliminated even if the seam extends through transverse grooves. However, since very frequently the seam is at least to a certain extent the basis of surface damage on a tire when the latter is seriously deformed, it is advisable to mold the tire so that the seam will not be located within the area of the highest peripheral line of the tread which is normally subjected to the highest stresses. For this purpose it is also advisable to shift the continuous middle rib toward one side of this highest peripheral line. This is preferably done toward the side of the tread opposite to the outer shoulder on which the continuous outer rib is provided. This has the additional advantage that the width of the tread part intermediate the two continuous ribs which is divided into individual lugs is thereby increased to such an extent that this part may be split up by at least three longitudinal grooves into at least two peripheral rows of lugs. Thus, there is at least one additional row of lugs between the two continuous ribs which improves the grip of the tire on the road considerably.

Another important feature of the invention consists in providing the part of the tread adjacent to the continuous rib on the outer shoulder of the tire with lugs of a smaller size than those on the other side of the tread by making the ratio between the negative tread component which is primarily formed by the grooves and the positive tread component which is formed by the ribs and lugs of a smaller size in the first mentioned part of the tread than in the other part of the tread. It is also possible to provide each of these parts, as seen in the same direction as mentioned above, first with a row of lugs of a relatively small size and then with one of a relatively large size. This has the effect that, when the vehicle is driven at any speed in a straight direction or at the usual lower speeds on mud or snow along curves, the part of the tread with the larger lugs will bear the load of the vehicle, while when driving the vehicle through curves on a dry road at higher speeds, the tire will be very effectively guided in the lateral direction.

In order to maintain separate lugs on the tread even though it has been worn off considerably, the grooves are preferably made of different depths insofar as their depth increases successively from one side to the other in accordance with the increase in size of the lugs.

It is further advisable to round off the outer side of the continuous tread rib on the outer shoulder of the tire so as to have a considerably larger radius of curvature than the rounded edge of the rib on the opposite shoulder. This has the advantage that, when the vehicle is driven through a curve at a high speed and the main load on the tire is displaced toward the outer shoulder and the tread is thereby considerably deformed, the size of the elliptical bearing surface of the tire will not be reduced or only to a minor extent. According to the invention, this purpose will be attained as effectively as possible by rounding off the tread on the outer continuous rib so as to merge gradually and without any interruption, that is, with a continuous curvature, into the side wall of the tire.

If the tire according to the invention is designed in the manner as above described and also made of different kinds of rubber, it will comply with all requirements for attaining a secure grip on the road and of possessing excellent non-skid properties under all driving and road conditions, and also of being completely secure and roadworthy for a very long time with the best possible tire properties.

The features and advantages of the present invention will become more clearly apparent from the following detailed description thereof which is to be read with reference to the accompanying drawings, in which—

FIGURE 1 shows a top view of a part of a tire according to the invention which is provided with a continuous central tread rib;

FIGURE 2 shows a cross section which is taken along the line 2—2 of FIGURE 1; while FIGURE 3 shows a top view of a part of a tire according to a modification of the invention with a different tread pattern, in which the central tread rib is divided into individual lugs and the continuous tread rib extends along one side thereof.

In the drawings, FIGURES 1 and 2 and FIGURE 3, respectively, illustrate two tires according to the invention which are provided with different tread patterns. By continuous peripheral grooves $r_1$ to $r_4$, the tread of both of these tires is divided transversely into several parallel ribs $P_1$, $P_2$ and $S_1$, $S_2$. Ribs $P_1$ and $P_2$ are continuous, while ribs $S_1$ and $S_2$ are divided by intermediate grooves into individual lugs. The continuous rib $P_1$ of both tires extends along one shoulder of the tire, and each tire is to be mounted on the wheel rim so that this shoulder with the continuous rib $P_1$ faces outwardly of the car and therefore has to take up the main stresses to which the wheel is subjected when the car is driven through a sharp curve.

The highest peripheral line Z of the uncompressed part of the tire which forms the center of impact of the tire according to FIGURES 1 and 2 coincides with the center of the continuous central rib $P_2$ and preferably also with the seam which is caused by the process of molding the tire. Rib $S_1$ is divided by the longitudinal grooves $r_1$ and $r_2$ and transverse grooves $q_1$ into lugs $S_1$. The inner longitudinal groove $r_2$ has a slightly greater width than the outer groove $r_1$. Rib $S_2$ at the other side of the continuous central rib $P_2$ is divided by the longitudinal ribs $r_3$ and $r_4$ and transverse grooves $q_2$ and $q_3$ into two rows of lugs $S_2$ and $S_3$. The longitudinal grove $r_4$ is preferably of a greater width than the longitudinal groove $r_3$, and the transverse groove $q_3$ of a greater width than the transverse groove $q_2$. Since the longitudinal and transverse grooves at the right or inner side of the tire are preferably also of a greater width than those of the left or outer side, both sets of grooves $r_1$ to $r_4$ and $q_1$ to $q_4$ increase successively in width from one side of the tire to the other. The outer surfaces of the lugs $S_1$, $S_2$, and $S_3$ may, however, be either of the same size or of different sizes, for example, by likewise increasing successively from the outer to the inner side of the tire, provided the ratio between the (negative) groove surfaces and the (positive) lug surfaces increases from the left toward the right and approaches, for example, the value 1. The size of the tread surface therefore increases both within each section $S_1$ and $S_2$ and also from $S_1$ to $S_2$, i.e., from the outer shoulder $a$ which is formed by the rib $P_1$ toward the inner shoulder $i$.

As illustrated in FIGURE 2, the depth of the longitudinal grooves also increases from $r_1$ toward $r_4$ in accordance with the increased wear upon the tire at the inner side, especially within the area of the lugs $S_2$. The same may apply to the transverse grooves $q_1$ to $q_3$.

As may also be seen in FIGURE 2, the tread surface of rib $P_1$ gradually merges by a smoothly curved part $a_1$ without any grooves into the side wall of the tire so that, when the load on the tires is displaced toward the outside, the elliptical bearing surface of the tire can shift continuously in the outward direction and a reduction in the size of this surface will thus be effectively counteracted, while on the inner shoulder $i$ the tread is sharply defined toward the inside by a slightly rounded edge $i_1$ or even by a sharp edge on the lugs $S_3$.

The tread pattern of the tire according to FIGURE 3 differs from that according to FIGURES 1 and 2 primarily by the fact that the additional continuous rib $P_2$ is not located within the center of impact $z$ but is shifted toward the inner side of the tread opposite to the rib $P_1$. The seam $n$ which is formed by the process of molding the tire preferably coincides substantially with the center of rib $P_2$. Rib $S_1$ is divided by the longitudinal grooves $r_1'$, $r_2'$, and $r_3'$ and the transverse grooves $q_1'$ and $q_2'$ into the lugs $s_1'$ and $s_2'$, while rib $S_2$ is divided by the longitudinal groove $r_4'$ and the transverse grooves $q_3'$ into the lugs $s_3'$. The coarseness of the lug portion of the tread of this tire also increases in the direction from $a$ to $i$, for example, by making the longitudinal grooves from $r_1'$ toward $r_3'$ or $r_4'$ and the transverse grooves from $q_1'$ toward $q_2'$ or $q_3'$ of a successively increasing width. If desired, the surface area of the lugs may also in this case increase from $s_1'$ toward $s_2'$ or $s_3'$. In all other respects, the tire according to FIGURE 3 may be of the same structure and design as the tire according to FIGURES 1 and 2.

If the tires according to the invention are to be used as winter tires, the lugs may also be provided with spikes, but preferably only the lugs $s_3$ or additionally also the lugs $s_2$ of the tire according to FIGURES 1 and 2 or only the lugs $s_3'$ of rib $S_2$ of the tire according to FIGURE 3, whereas the grooved rib $S_1$ and the continuous rib $P_1$, and also the continuous rib $P_2$ at least of the tire according to FIGURES 1 and 2, are preferably not provided with spikes.

Instead of being divided into lugs by longitudinal and transverse grooves, the respective ribs may also be divided either partly or entirely by diagonal or similarly extending grooves, for example, by grooves extending along a zigzag line.

In accordance with the different requirements to which the different parts of the tread are subjected, the shoulder section A of the tire together with the continuous rib $P_1$ thereon is made of a non-skid rubber, the remaining part B of the tread including the ribs $S_1$, $P_2$, and $S_2$ consists of a wear-resistant rubber, while the other parts C of the tire may consist of the same kind of rubber of which the side walls of tires are conventionally made. The individual parts of the tire which consist of different kinds of rubber preferably overlap each other, as indicated in FIGURE 2 by the dotted lines $x_1$, $x_2$, and $x_3$, so as to insure a firm connection between the different kinds of rubber. The marginal areas between these different kinds of rubber also do not have to be sharply defined, but they may intermingle with each other so as to change gradually from one kind of rubber to the other.

Although our invention has been illustrated and described with reference to the preferred embodiments thereof, we wish to have it understood that it is in no way limited to the details of such embodiments but is capable of numerous modifications within the scope of the appended claims.

Having thus fully disclosed my invention, what we claim is:

1. A motor vehicle tire with an outside rubber cover, comprising side walls, a tread having grooves including cross-grooves having a directional component transverse to the peripheral direction, a first tread area portion adjacent to one shoulder and relatively unaffected by said cross-grooves, a second tread area portion adjacent to the other shoulder and being relatively greatly subdivided by said cross-grooves, said first tread area portion being made of rubber possessing relatively great resistance to skidding and said second tread area portion being made of rubber possessing relatively great resistance to wear.

2. The motor vehicle tire of claim 1, wherein said first tread area portion is adjacent to the outside shoulder of the motor vehicle tire.

3. The motor vehicle tire of claim 1, where said grooves generally increase in depth from said first tread area portion toward the other shoulder of said second tread area portion.

4. The motor vehicle tire of claim 1, where said grooves generally increase in width from said first tread area portion toward the shoulder of said second tread area portion.

5. The motor vehicle tire of claim 1, wherein the angle of said cross-grooves relative to the peripheral direction generally increases from said first tread area portion toward the shoulder of said second tread area portion.

6. The motor vehicle tire of Claim 1, including spikes arranged solely in that portion of said second tread area portion that is adjacent to its corresponding shoulder.

7. An automobile tire as defined in claim 1, in which the layers of different kinds of rubber overlap each other so as to be more firmly secured to each other.

8. The motor vehicle tire of claim 1, where said first tread area portion is rounded off and has a radius of curvature that is greater than the radius of curvature of said second tread area portion adjacent to its corresponding shoulder.

9. The motor vehicle tire of claim 8, wherein said first tread area portion is rounded off to merge smoothly into its corresponding side wall.

10. The motor vehicle tire of claim 1, wherein said first tread area portion comprises a continuous uninterrupted peripheral rib.

11. The motor vehicle tire of claim 10, wherein said second tread area portion comprises a plurality of lug portions formed by said grooves, and said first and second tread area portions form the entire tread area.

12. An automobile tire as defined in claim 10, in which said second tread area portion comprises a further rib extending continuously without interruption within a central area of the tread in the peripheral direction of the tire, and at least one row of individual lugs intermediate said two continuous ribs.

13. An automobile tire as defined in claim 12, in which the highest peripheral line of said tire is located within said further continuous rib.

14. An automobile tire as defined in claim 12, in which a seam is formed on said tread by molding the tire in a two-part mold, said seam being located within said further continuous rib.

15. An automobile tire as defined in claim 12, in which said first continuous rib is located adjacent to the side wall of said tire forming the outer side wall when the tire is mounted for use on an automobile, and at least one further row of individual lugs intermediate said further continuous rib and the inner side wall of said tire.

16. An automobile tire as defined in claim 15, in which the individual lugs intermediate said continuous ribs are of a smaller size than the lugs intermediate said further rib and the inner side wall of said tire.

17. An automobile tire as defined in claim 15, in which said individual lugs form a pair of adjacent rows along at least one side of said further continuous rib, said lugs of that row of said pair spaced at a smaller distance from said outer side wall than the other row of said pair having a smaller size than said lugs of said other row.

18. An automobile tire as defined in claim 15, in which said tread comprises a plurality of parallel rows of individual lugs, said lugs in each of said rows being of a larger size than the preceding row, as seen in the direction from said outer side wall to said inner side wall of said tire.

19. In an automobile tire having an outer rubber part comprising a tread and outer side walls, one part of said tread that is normally subjected to the highest stresses consisting of a rubber having a relatively high wear resistance, another part of said tread consisting of another kind of rubber having relatively high anti-skid properties for preventing the tire from slipping, especially in lateral directions, and the remainder of the rubber part of said tire comprising at least the side walls of said tire consists of a third kind of rubber conventionally used for the side walls of a tire.

20. In an automobile tire having an outer rubber part comprising a tread and outer side walls, one part of said tread consisting of a rubber having high anti-skid properties and comprising a rib extending continuously without interruption in the peripheral direction of the tire at least on one shoulder thereof, another part of said tread consisting of a rubber having a high wear resistance and comprising at least one row of individual lugs extending in the peripheral direction of said tire, said other tread part consisting of a rubber having a higher wear resistance comprises a further rib extending continuously without interruption within a central area of the tread in the peripheral direction of the tire, at least one row of individual lugs intermediate said two continuous ribs, said first continuous rib being located at one side of and spaced from the highest peripheral line, and at least one further row of individual lugs intermediate said further continuous rib, and the inner side wall of said tire.

21. A motor vehicle tire with an outside rubber cover, comprising side walls, a tread having grooves including cross-grooves having a directional component transverse to the peripheral direction, a first tread area portion adjacent to one shoulder and relatively unaffected by said cross-groove, a second tread area portion adjacent to the other shoulder and being relatively greatly subdivided by said cross-groove, and said grooves generally increasing in depth from said first tread area portion toward the other shoulder of said second tread area portion.

References Cited by the Examiner
UNITED STATES PATENTS

| | | | |
|---|---|---|---|
| 1,664,352 | 3/1928 | Coleman | 152—362 X |
| 2,130,524 | 9/1938 | Clark | 152—352 |
| 2,627,888 | 2/1958 | Bull | 152—210 |
| 3,155,135 | 11/1964 | Klenk | 152—209 |
| 3,162,229 | 12/1964 | Ellenrieder et al. | 152—209 |

ARTHUR L. LA POINT, *Primary Examiner.*

C. HAEFELE, *Assistant Examiner.*